US006259568B1

(12) United States Patent
Rybczynski

(10) Patent No.: US 6,259,568 B1
(45) Date of Patent: Jul. 10, 2001

(54) OPTICAL IMAGING SYSTEM AND GRAPHIC USER INTERFACE

(75) Inventor: Zbigniew Rybczynski, Köln (DE)

(73) Assignee: Zbig Vision Gesellschaft für neue Bildgestaltung mbH (DE)

( * ) Notice: Subject to any disclaimer, the term of this patent is extended or adjusted under 35 U.S.C. 154(b) by 0 days.

(21) Appl. No.: 09/506,623

(22) Filed: Feb. 18, 2000

Related U.S. Application Data

(62) Division of application No. 09/230,895, filed as application No. PCT/DE98/01121 on Apr. 17, 1998.

(30) Foreign Application Priority Data

Apr. 17, 1997 (DE) ............................................ 197 16 958

(51) Int. Cl.[7] ............................ G02B 15/14; G02B 23/00

(52) U.S. Cl. ........................... 359/676; 359/422; 359/432

(58) Field of Search .................................... 359/664, 676, 359/680, 682, 725, 422, 432, 362, 363, 379, 380, 399, 400; 353/101

(56) References Cited

U.S. PATENT DOCUMENTS 2,402,216 * 6/1946 Vinnigerholz ........................ 359/664
3,404,934 * 10/1968 Brachvogel et al. ................ 359/504
3,514,186 * 5/1970 Poncelet .............................. 359/664
4,045,116 * 8/1977 Larusa ................................. 359/364
5,004,328 * 4/1991 Suzuki et al. ........................ 359/664
5,563,650 * 10/1996 Poelstra ................................ 348/36

OTHER PUBLICATIONS

G. Schröder; Technische Optik, 7th Edition, Vogel Buchverlag Würzburg, pp. 122–129; Jan. 1990.

* cited by examiner

*Primary Examiner*—Georgia Epps
*Assistant Examiner*—David N. Spector
(74) *Attorney, Agent, or Firm*—Norris, McLaughlin & Marcus, P.A.

(57) ABSTRACT

The invention relates to an optical imaging system for imaging an object with progressively adjustable magnification. The inventive system comprises an imaging plane for projecting an image field originating from the object and an imaging optical system situated on the object side in front of the imaging plane, preferably with a fixed focal length for producing the image field on the imaging plane. Said imaging optical system and/or said imaging plane are arranged so that they can move in the direction of the optical axis in order to adjust the magnification and/or focus the image appearing on the imaging plane. A first optical element which receives optical radiation through a wide angle is provided on the object side in front of the imaging optical system to select and/or transmit those light beams originating from the object, said light beams running through a predetermined focal point or nodal point, and a second optical element is positioned between the first optical element and the imaging optical system in such a way that the light beams running through the predetermined focal or nodal point produce an image of the object in an intermediate image plane. This image can then be projected by the imaging optical system into the imaging plane in various sizes in such a way as to produce an image field with varying magnification in the area of the imaging plane.

12 Claims, 20 Drawing Sheets

N
6
5
1
4
3
2

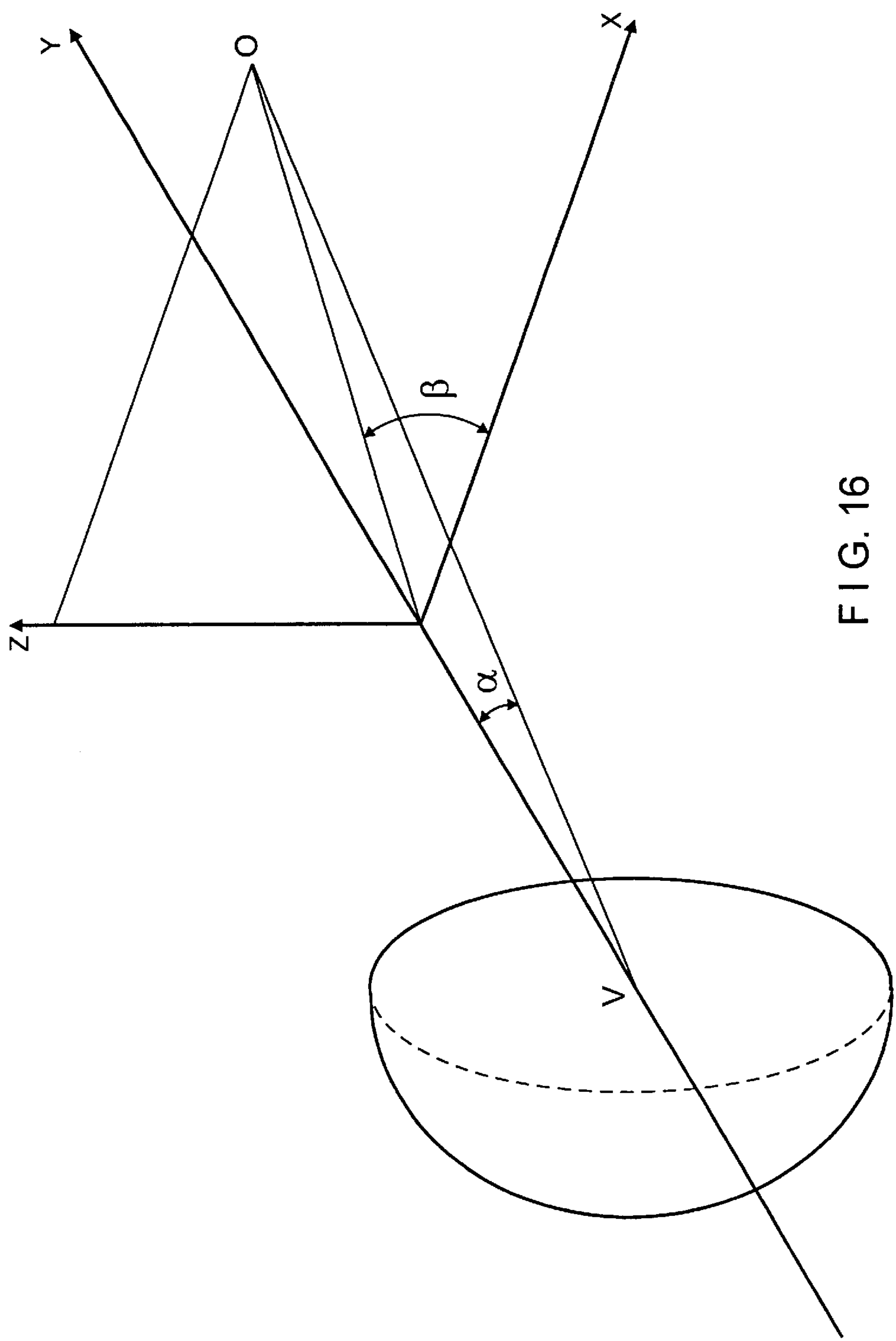
F I G. 16

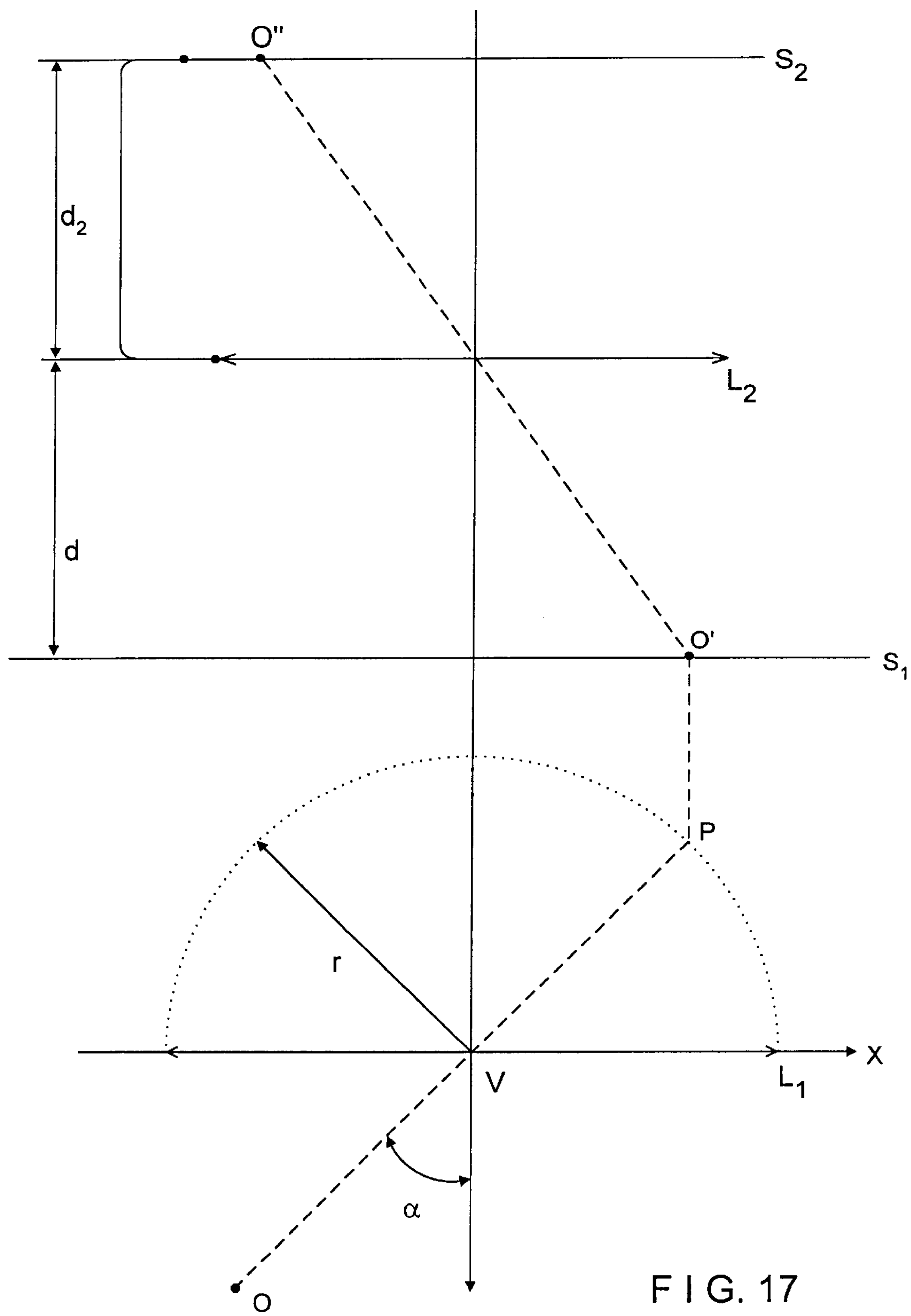
F I G. 17

OPTICAL IMAGING SYSTEM AND GRAPHIC USER INTERFACE

This application is a divisional of application Ser. No. 09/230,895 filed Feb. 2, 1999 which is a 371 of PCT/DE98/01121 filed Apr. 17, 1998.

BACKGROUND OF THE INVENTION

The invention relates to an optical imaging system for reproducing an object with an infinitely variable magnification (zoom) as defined in the introductory portion of claim 1, as well as to a graphic user interface, as defined in claim 12.

From SCHRÖDER, G.: Technische Optik, 7th edition, Vogel Buchverlag Würzburg, pages 128 ff., an optical imaging system in the form of a zoom lens is known, which enables an object to be reproduced with an infinitely variable magnification.

The previously known zoom lens consists essentially of several lenses, two of the lenses being movable along the optical axis. This makes it possible, on the one hand, to vary the focal length and, with that, the magnification infinitely and, on the other, to adapt the focusing to the changed focal length, so that the plane of the image plane can remain unchanged when the focal length is varied.

It is a problem of the previously known zoom lens that the sine error, which arises during the reproduction, varies with the respective focal length setting of the zoom lens. When images with different focal length settings are superimposed, this variation leads to an image, which gives the impression of being unnatural, because of the different optical imaging errors of the images, which are to be superimposed.

SUMMARY OF THE INVENTION

It is therefore an object of the invention to provide an optical imaging system, which enables an object to be reproduced with infinitely variable magnification and with sine errors, which are independent of the respective magnification. It is furthermore an object of the invention to provide a graphic user interface for the multivalent representation of the image.

The invention includes the technical teachings of reproducing the object initially independently of the respective focal length setting with a constant magnification on a two-dimensional interim image and of then photographing this interim image with the desired magnification, so that the sine distortions, occurring during the reproduction process, are independent of the respective focal length setting.

The concept of object is to be understood generally here and in the following and comprises an individual object, a spatial scene as well as a two-dimensional presentation.

Pursuant to the invention, preferably those light rays, which emanate from the object and pass through the nodal or focal point, form the image. For selecting the light rays, passing through the nodal point, from the totality of the rays emanating from the object, an optical element is provided pursuant to the invention and, in a preferred embodiment, is formed as a spherical lens. The light rays, which strike the spherical lens perpendicularly to the spherical surface, experience, in accordance with the refractive index law, no or only a slight change in direction, and thus proceed centrally through the center point of the spherical lens, whereas the remaining rays are deflected and thus do not contribute to the imaging. The spherical lens thus selects the rays, which strike the lens from a wide-angled region and, at the same time, pass centrally through its center point, so that the center point of the spherical lens is the nodal or focal point of the imaging rays.

The invention, however, is not limited to a spherical lens for selecting the rays passing through the nodal point. For example, a pinhole diaphragm or an appropriate lens system can also be used. The nodal or focal point of the imaging rays coincides here with the center point of the pinhole diaphragm.

When a spherical lens is used, as well as when a pinhole diaphragm is used for selecting the rays passing through a certain nodal point, it is, in principle, not possible and, for an adequate intensity of light, also not desirable to select exclusively those rays, which pass exactly through the nodal point. Rather, other rays also, which extend in the vicinity of the nodal point, are interrupted, forming the image, and, with that, selected. The only thing that matters for the functioning of the inventive optical imaging system is that the optical element produces a constricted bundle of rays in the region of the nodal point.

Furthermore, the inventive, optical imaging system preferably has a further optical element, which is downstream from the first optical element and preferably has at least one planoconcave lens or a lens system, containing a corresponding optical system, the concavely shaped side of the planoconcave lens facing the first optical element. For a preferred embodiment, the planoconcave lens is disposed in such a manner, that its focal point coincides with the nodal point of the imaging rays, so that, the rays, passing through the nodal point, after being deflected by the planoconcave lens, proceed parallel to the optical axis. Thus, from a diverging bundle of rays, the planoconcave lens generates parallel rays, which extend at right angles to the plane surface of the planoconcave lens.

In a preferred embodiment of the invention, the radius of the spherical lens is equal to the radius of curvature of the planoconcave lens, so that, on the side averted from the object, the spherical lens fits into the concave curvature of the planoconcave lens or of a corresponding optical system and forms a unit with the latter. For this embodiment, it is important that the refractive index of the planoconcave lens or of the corresponding optical system differs from the refractive index of the spherical lens, since otherwise the light rays would not be refracted at the interface between the spherical lens and the planoconcave lens.

Pursuant to the invention, the planoconcave lens (or the corresponding optical element, guiding the rays, emanating from the object, to a plane pictorial representation) is provided on its plane side with an interim image plane, preferably in the form of a diffusor layer, which enables an interim image to be generated from the parallel rays. This interim image plane, preferably in the form of a diffusor layer, can be either mounted directly on the plane surface of the planoconcave lens or consist of a separate diffusor plate.

The inventive optical imaging system thus initially selects, from the totality of light rays emanating from the object, essentially the rays, which pass through a particular nodal point. These light rays are then directed parallel to one another by the planoconcave lens or by an appropriate optical system and, on the interim image plane, which preferably is in the form of a diffusor layer, generate an interim image, which reproduces a wide-angled section of the image in orthographic projection.

By means of imaging optics with a fixed focal length, this interim image is then reproduced on a photosensitive imaging surface, which is directed parallel to the interim image plane, preferably in the form of a diffusor layer, and consists of a light-sensitive film or a CCD sensor element as target. The diaphragm plane is between the interim image plane and the imaging plane, that is, as seen from the object, on the far side of the focus of the first optical element.

For adjusting the focal length and/or for focusing the image, appearing on the imaging plane, the imaging optics and/or the imaging plane are disposed so that they can be shifted parallel to the optical axis. By shifting the imaging optics and/or the imaging plane parallel to the optical axis, the magnification and, with that, the section of the image appearing on the imaging plane, can be adjusted infinitely variably. The arrangement functions like a zoom lens, the distortion being independent of the "focal length setting" and, with that, does not have to be corrected. The focal point of the first optical element is in front of the diaphragm plane.

In the simplest version, the imaging optics consist of a single lens, which can be shifted parallel to the optical axis of the imaging system. Usually, however, lens imaging systems with several individual lenses are used.

Since the imaging optics of the inventive optical imaging system reproduce not the object itself, which usually is three dimensional, but the two-dimensional interim image appearing on the interim image plane, preferably in the form of a diffusor layer, the sine distortions advantageously are independent of the particular setting of the magnification.

A further advantage of the inventive, optical imaging system is seen to lie therein that the images, obtained in this manner, can also be superimposed on images of other viewing angles and other focal length settings, an image being obtained, which gives a natural impression without any signs of interfering distortions at the edges of the image due to the superimposing, since the image geometry is identical for all settings.

In a preferred embodiment of the invention, the imaging optics are disposed in the body of a tube, which is aligned parallel to the optical axis of the imaging system and can be rotated about its longitudinal axis. On the inside of the body of the tube, there are catches here which, when the body of the tube is rotated, endeavor to rotate one or several lenses of the imaging objects. However, since these lenses are secured against rotation and can be moved only in the axial direction, the lenses carry out an evasive axial movement when the body of the tube is rotated. It is thus possible, by rotating the body of the tube, to shift lenses of the imaging optics in the axial direction and, with that, setting the magnification of the optical imaging system.

In an advantageous variation of the invention, automatic focusing is provided, which automatically focuses the imaging optics as a function of the magnification set. In this way, manual focusing can be omitted when the magnification is changed.

One possibility of focusing consists of shifting one or several lenses along the optical axis of the imaging system in such a manner, that the imaging plane lies in the image plane.

On the other hand, for a different possibility, the imaging plane itself is shifted, so that the image plane and the imaging plane coincide.

In both cases, the focusing equipment receives the axial position of the movable parts of the optical imaging system as an input variable and calculates from this the shifting of the imaging plane or of one or several lenses, required for the focusing.

BRIEF DESCRIPTION OF THE DRAWINGS

Other advantageous further developments of the invention are characterized in the dependent claims or, together with the description of examples of the invention, are explained in greater detail below by means of the Figures, of which FIG. 1 as a example of the invention, shows an optical imaging system in a perspective representation.

a) linear projection system with small viewing angle b) linear projection system with large viewing angle c) orthographic projection system with small viewing angle d) orthographic projection system with large viewing angle, FIG. 16 shows a method of describing the direction of the ray for the set of orthographic lenses, FIG. 17 shows the image generating process for the set of orthographic lenses.

DESCRIPTION OF THE PREFERRED EMBODIMENTS

Figure 1:
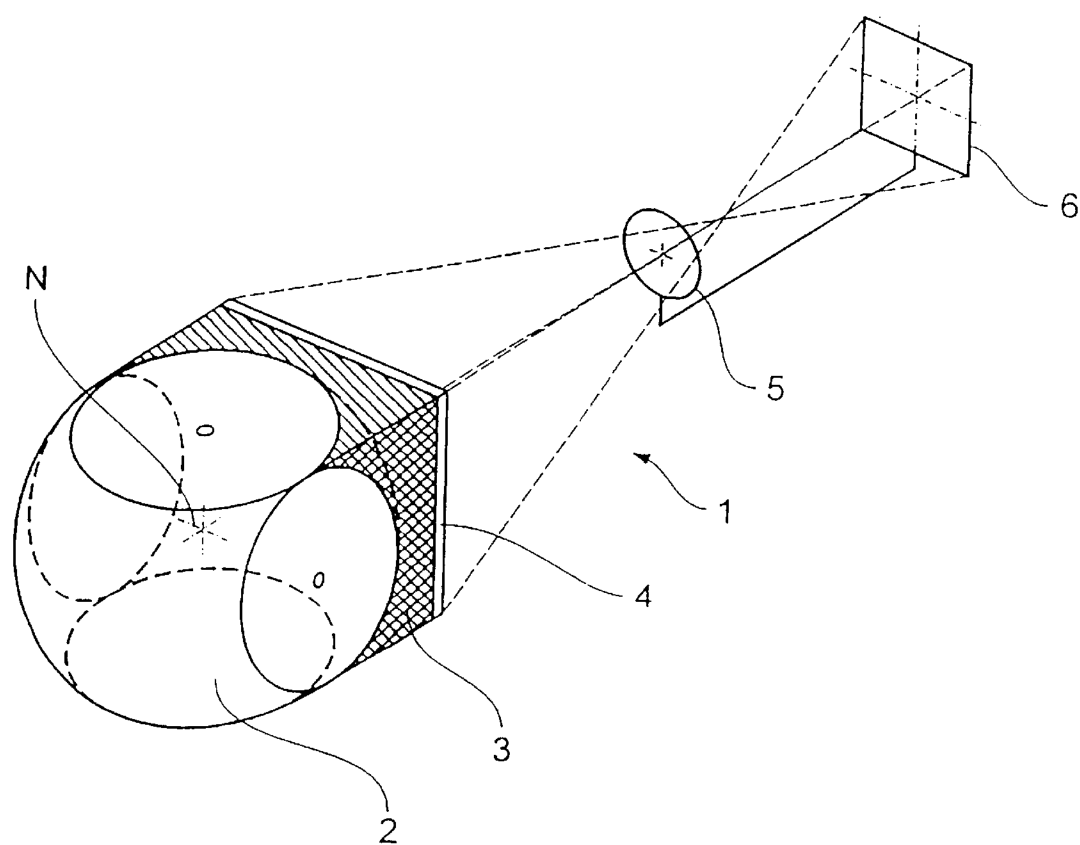

The optical imaging system 1, shown in FIG. 1, enables a spatial scene to be imaged with little distortion and infinitely variable magnification. Because the barrel-shaped or pillow-shaped distortions are largely suppressed, the images, photographed by the optical imaging system 1, can be superimposed easily without, for example, any signs of the disturbing distortion in the resulting image. Preferably, the representation is of the orthographic type.

In order to make low distortion imaging possible, the optical imaging system 1 has a spherical lens 2, which forms a first optical element and is connected at its outer surface on one side with a planoconcave lens 3, which forms a second optical element. The radius of curvature of this planoconcave lens 3 is equal to the radius of the spherical lens 2, which thus fits exactly into the concave curvature of the planoconcave lens 3 and forms a unit with the latter. To decrease the overall size, the spherical lens 2 is flattened at the sides, at the top and at the bottom, so that the unit of a spherical lens 2 and a planoconcave lens 3, apart from the spherical surface on the object side, has an almost rectangular shape. The spherical lens enables wide-angle, incident optical radiation to be processed, so that a large image angle can be achieved.

The planoconcave lens 3 is manufactured here from a material having a refractive index different from that of the spherical lens 2, the refractive index of the planoconcave lens 3 being selected so that its focal point lies in the center N of the spherical lens 2. In this way, it is achieved that the rays, passing centrally through the spherical lens 2, after being deflected at the interface between the spherical lens 2 and the planoconcave lens 3, proceed parallel to the optical axis.

The light rays, directed in parallel in this manner, then strike the plane surface of the planoconcave lens 3 perpendicularly and generate an interim image on the diffusor layer 4 deposited there.

The light rays, emanating from the object points of the spatial scene that is to be represented, thus pass through the spherical outer surface of the spherical lens 2, enter the optical imaging system, proceed centrally through the center N of the spherical lens 2 and are then aligned in parallel at the interface between the spherical lens 2 and the planoconcave lens 3, so that an image of the spatial scene appears on the diffusor layer 4.

The image, appearing on the diffusor layer 4, however reproduces the spatial scene with a constant magnification and functions merely as an interim image for generating images with infinitely variable magnification. For this purpose, a camera 5, 6 with automatic focusing, which can be shifted along the optical axis of the imaging system, is disposed behind the diffusor layer 4 and thus images the image appearing on the diffusor layer with infinitely variable magnification on the camera film 6. In the simplest version shown here, the camera consists of a light-sensitive film 6 and a lens 5, which is disposed between the diffusor layer 4 and the film 6 and aligned with its optical axis at right angles to the plane of the film and can be shifted along the optical axis in order to adjust the magnification. Since the camera 5, 6 always reproduces the two-dimensional interim image appearing on the diffusor layer 4 and not the spatial scene itself, sine distortions, which arise during the reproduction, are independent of the magnification factor or the zoom position of the camera 5, 6.

Figure 2:
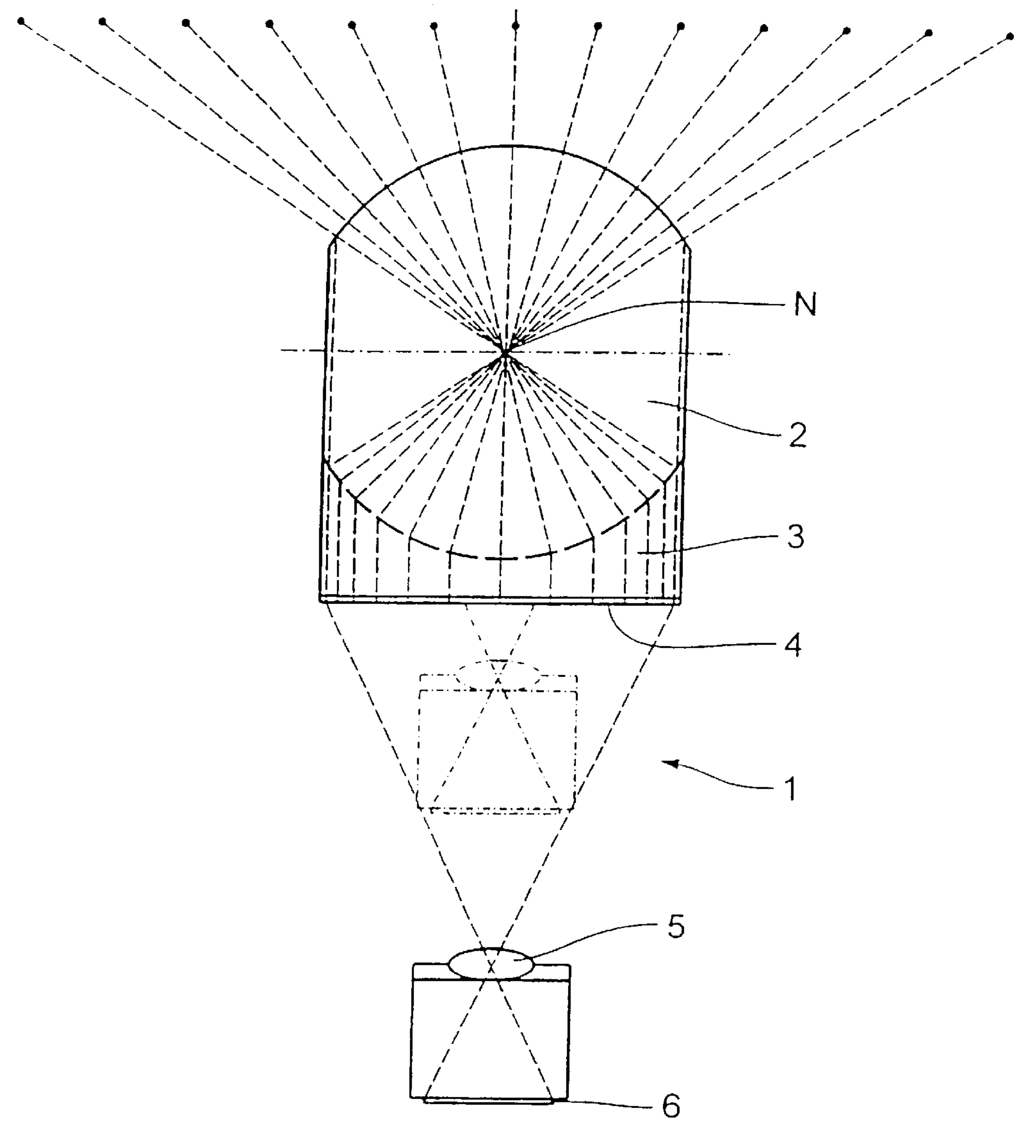
FIG. 2 shows the path of the rays in the optical imaging system of FIG. 1 in cross section.

The path of the rays in the optical imaging system described above is shown in detail in the cross-sectional representation in FIG. 2. For the sake of simplification, as well to maintain clarity, only the rays, emanating from individual, equidistantly disposed object points, are shown.

These rays pass through the spherical outer surface of the spherical lens 2, enter the optical imaging system and pass centrally through the center N of the latter. On the opposite side, the rays then strike the interface between the spherical lens 2 and planoconcave lens 3. Since the focal point of the planoconcave lens 3 is in the center N of the spherical lens 2 and the rays, striking the interface, pass centrally through the spherical lens 2 and, with that, through the focal point N of the planoconcave lens 3, the rays are directed in parallel by the planoconcave lens 3 and thus strike at right angles the diffusor layer 4, which is applied on the plane surface of the planoconcave lens 3, so that an image of the spatial scene, which is independent of the particular magnification, appears on the diffusor layer 4.

Behind the diffusor layer 4, a camera 5, 6 with a fixed focal length is disposed. It can be shifted along the optical axis of the imaging system and thus makes it possible to reproduce the image, which appears on the diffusor layer 4, with infinitely variable magnification. For this purpose, the camera 5, 6 is shifted along the optical axis and focused in the position with the desired magnification factor and the therefrom resulting image section. In the camera, there is a diaphragm, which is not shown in the drawing. As seen from the object, the diaphragm is thus disposed on the far side of the nodal or focal point.

Figure 3:
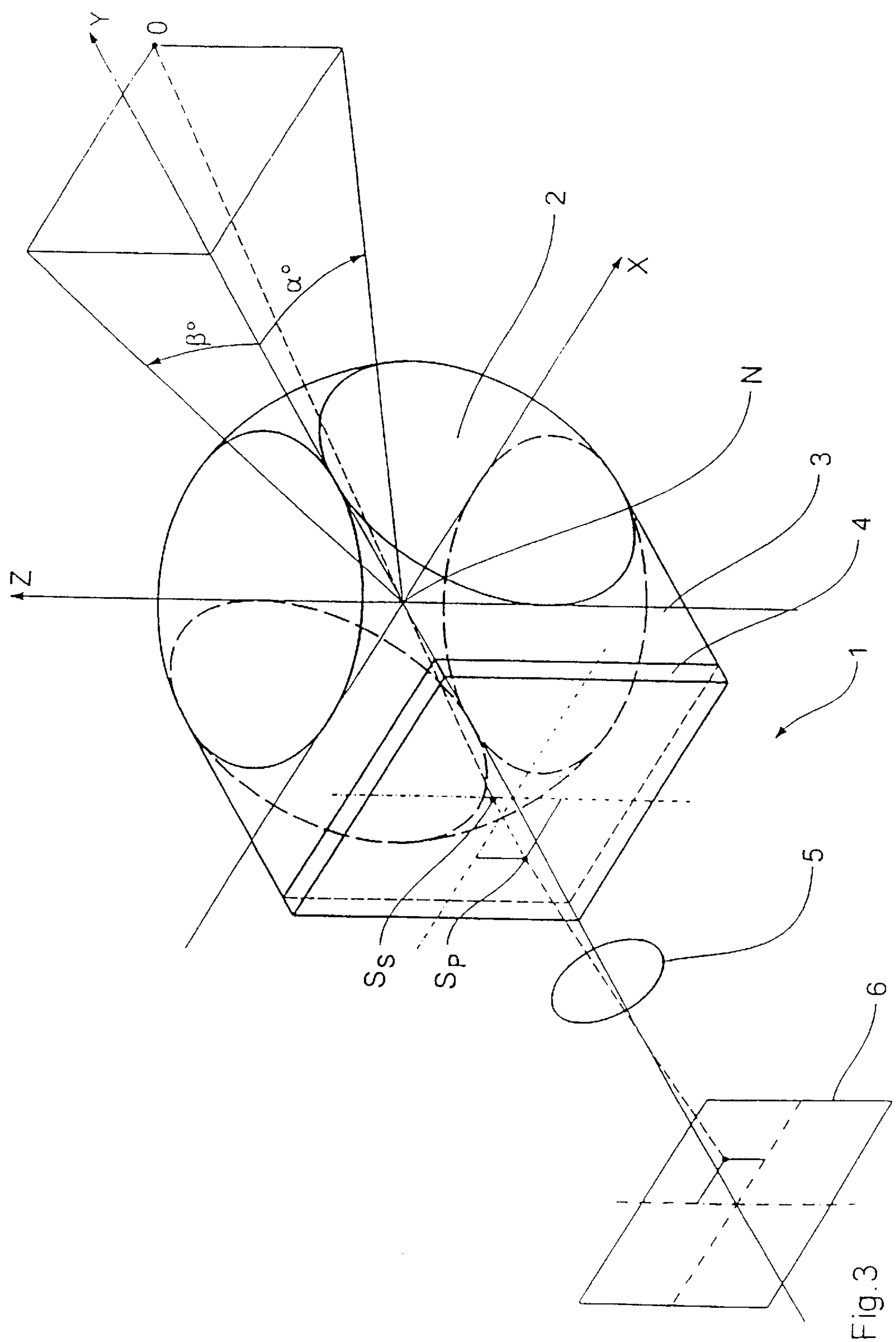
FIG. 3 shows the construction of a ray in the optical system of FIGS. 1 and 2 as an example of an object point.

The mathematical, geometric construction of the course of the rays is shown, by way of example, in FIG. 3 by means of the light ray emanating from an object O ($O_x$, $O_y$, $O_z$). This light ray passes through the center N of the spherical lens at the elevation angle of β° and the azimuth angle of α°. The elevation angle β° is the angle between the incident light ray and the horizontal plane, while the azimuth angle α° describes the angle between the perpendicular plane, extending parallel to the optical axis, and the incident ray.

Azimuth angle $\alpha_o$ and elevation angle $\beta_o$ are calculated here from the coordinate values $O_x$, $O_y$, $O_z$ of the object point P using the formulas $$\alpha_o = \arctan\frac{O_x}{O_y}$$

$$\beta_o = \arctan\frac{O_z}{O_y}$$

The incident ray of light then passes through the spherical lens 2 centrally and, on the opposite side at point Ss, strikes the spherical interface between the lens 2 and the planoconcave lens 3, the focal point of which coincides with the center N of the spherical lens, so that the rays, passing centrally through the spherical lens 2, are aligned in parallel by the planoconcave lens 3.

The ray, emanating from the object point O, is therefore deflected by the planoconcave lens 3 and subsequently proceeds parallel to the optical axis and finally strikes the diffusor layer 4 at point SP. The coordinate values $S_{px}$, $S_{pz}$ of this point SP are calculated here from the azimuth angle ax and the elevation angle β of the incident ray using the following formulas:

$$S_{px} = -\sin\alpha\cos\beta$$

$$S_{pz} = -\cos\alpha\sin\beta$$

The image, appearing on the diffusor layer 4, has a constant magnification here and therefore functions only as an interim image for generating an image with an infinitely variable magnification factor. For this purpose, the image points, appearing on the diffusor layer 4, are imaged by a lens 5 onto the film plane 6, the coordinate values $P_x$, $P_z$ of the image point P in the film plane 6, corresponding to the object point O, being calculated from the following formulas:

$$P_x=\sin\alpha\cos\beta f=-S_{px} f$$

$$P_z=\cos\alpha\sin\beta f=-S_{pz} f$$

The factor F is obtained from the radius r of the spherical lens 2 and the width b of the imaging plane 6 in the film plane $$f=\frac{b}{r}$$

With the invention, different sections of the image can be reproduced, the lens system remaining corrected for all image sections.

Figure 4:
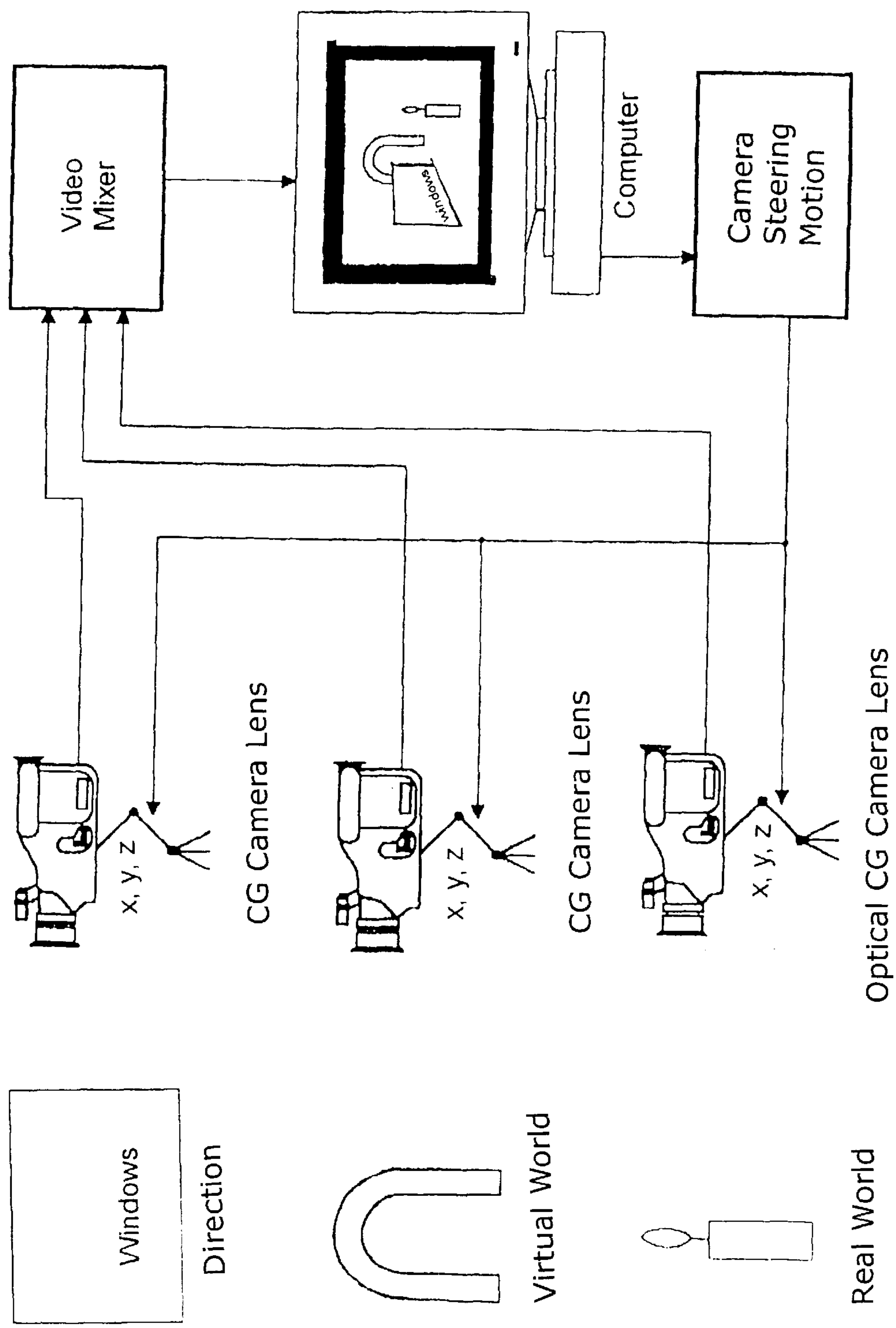
FIG. 4 shows a block representation of the system.

In the following description, a new type of graphic user interface is to be characterized by means of examples. This interface is intend ed to enable images of objects of the real world and of the virtual world, as well as other computer applications, to be represented on a computer terminal. FIG. 4 shows a block diagram of the interface.

The components of an image, which is to be represented on an interface output platform (typically a computer monitor), are produced by a set of cameras, which is constructed using an orthographic zoom lens system (or its model). The set of cameras comprises real cameras, which are directed onto objects of the real world, and virtual cameras, which are created with the help of computer expansion cards and are directed onto virtual objects and computer applications. The images, generated by the set of cameras, are fed into a video mixer, which forms a component of the interface. The video mixer generates the finished pictures, which can then be sent to an interface output platform. The camera positions are controlled by an interface system for the camera control.

In order to ensure communication between user and system, the interface is provided with input and output platforms. The input platform makes it possible to manipulate the components of the resultant image and to generate messages to the applications installed in the system. The output platform enables the resultant images to be represented and, with that, the state of the installed applications to be made visible.

The interface enables the movement paths of the cameras, as well as their viewing directions and angles, to be arranged freely. Each camera in the system can be activated independently of or synchronously with other cameras. As a result of the interface activity, any image desired can be represented on the screen.

Two basic distinguishing features, which differentiate the interface, introduced here, from the other present graphic user interfaces, are now to be emphasized. First of all, the resultant image is achieved by the use of orthographic projection which, in contrast to the usual linear projection, perfectly reproduces the manner in which a human eye sees the surroundings (the comparison between linear and orthographic projections is shown in even greater detail in the following). Secondly, the system enables a final image to be created without limitations. This image may contain reproductions of objects of the real world, of objects of a virtual world, as well as computer applications. Due to the movement control system and the use of the video mixer within the resultant image, all of these reproductions can change and move at will. The movement control system is in a position to control the positions and direction of the cameras and, what is even more important, to repeat the movements of the individual cameras as well as of sets of cameras with the same precision (in this case, synchronously if required). The camera movement control system is also described in greater detail in the following. The video mixer offers modem image processing methods for freely manipulating the components of the image in the working environment.

With regard to the logical system structure, the interface has the following components:

- a system of computer graphic (CG) lens cameras (for "observing" virtual worlds and applications) on the basis of the model of a set of orthographic zoom lenses;
- a movement control system for CG lens cameras
- a system of cameras with optical lenses (for observing the real world) equipped with orthographic zoom lens sets;
- a movement control system for cameras with optical lenses;
- video mixer;
- input platform;
- output platform;
- a 3D organization of the computer memory, based on the Cartesian space (YXYZ). This 3D memory is presented on the screen as an image of a 3D virtual world. In this world, the graphic interface of each software has a single position in space. This world is represented on the screen by means of an orthographic CG lens, which is an integrated part of the graphics card (hardware);
- a link from this memory (computer cartesian space) with the GPS (global Cartesian space) system.

A CG lens camera is understood to be a computer expansion card with appropriate software, which is able to construct two-dimensional images from observing a three-dimensional virtual world. The image construction process proceeds according to the principles of functioning of the orthographic zoom lens set. The virtual 3D world may contain virtual 3D objects, which were modeled utilizing scene modeling methods in cartesian space, and computer applications (such as Windows 95, autoCAD, XWindow), which are represented by virtual screens, which may be disposed in any way in a virtual space. These screens represent a means of communicating between the applications and a user.

A CG lens camera is characterized by three parameters: a viewing angle, a standpoint and a viewing direction. These parameters clearly define the nature, in which the camera perceives the virtual world.

An optical lens camera is understood to be a real camera which, similarly to a CG lens camera, permits two-dimensional images of the real world to be produced. Cameras with optical lenses, used in the interface, are equipped with orthographic zoom lens sets.

As in the above case, an optical lens camera is also defined by a viewing angle, a standpoint and a viewing direction.

The movement of the camera is controlled over a computer expansion card with appropriate software by means of suitable mechanical manipulators for operating the optical lens camera (in the event that such a camera is present in the system). This card makes it possible to calculate and then convert sequences of camera positions, as desired by the user, in order to move the camera(s) along prescribed paths. In this way, both camera types, virtual and real, which are present in the system, can be positioned at will and thus compose any movement progressions.

The images, generated by the system cameras, are sent as input to the video mixer. The mixer combines the images supplied and generates resultant images from them, which can be sent to the interface output platform. The capabilities of the mixer largely determine the capabilities of the system as a whole. If the system uses only a single lens camera, the video mixer can be omitted.

The task of an interface input platform is to make communication in the direction of the user system possible. This platform consists of basic input equipment, such as keyboards, mice, joysticks, etc. or of more complicated equipment, such as speech analyzers, which generate messages for controlling the system over the interface. There are two types of such messages:

interface messages, which modify the appearance of the resultant picture sent to an output platform;

application messages, which are transmitted for further processing to the applications programs installed in the system.

It is the task of an interface output platform to make communication in the direction from system to user possible. Each video device or a set of video devices for making the actual state of the interface (which reflects the state of the system as a whole) visible takes over the role of interface output platform.

Figure 5:
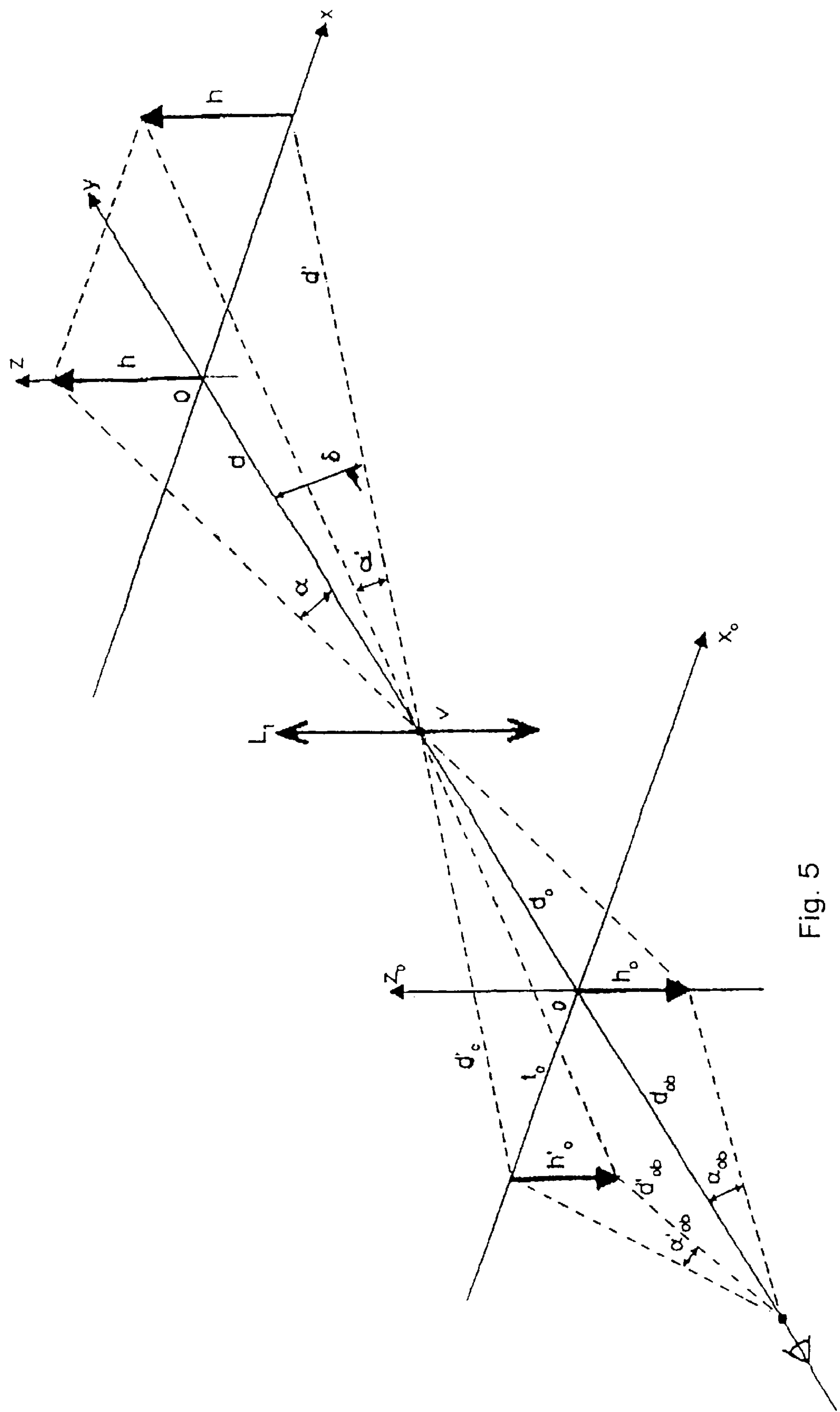
FIG. 5 shows the geometry of the linear projection.

In the following section, the distinguishing features of the image are compared, which result from the use of the linear or the orthographic projection. It is assumed that we have at our disposal the linear projection system shown in FIG. 5. We wish to know how the image height ho depends on the object height h, in the event that the object is in the optical axis y of the system. In the situation under consideration, this is a direct consequence of the Tale theorem that $$h_o = \frac{d_o h}{d} \tag{1}$$

Figure 6:
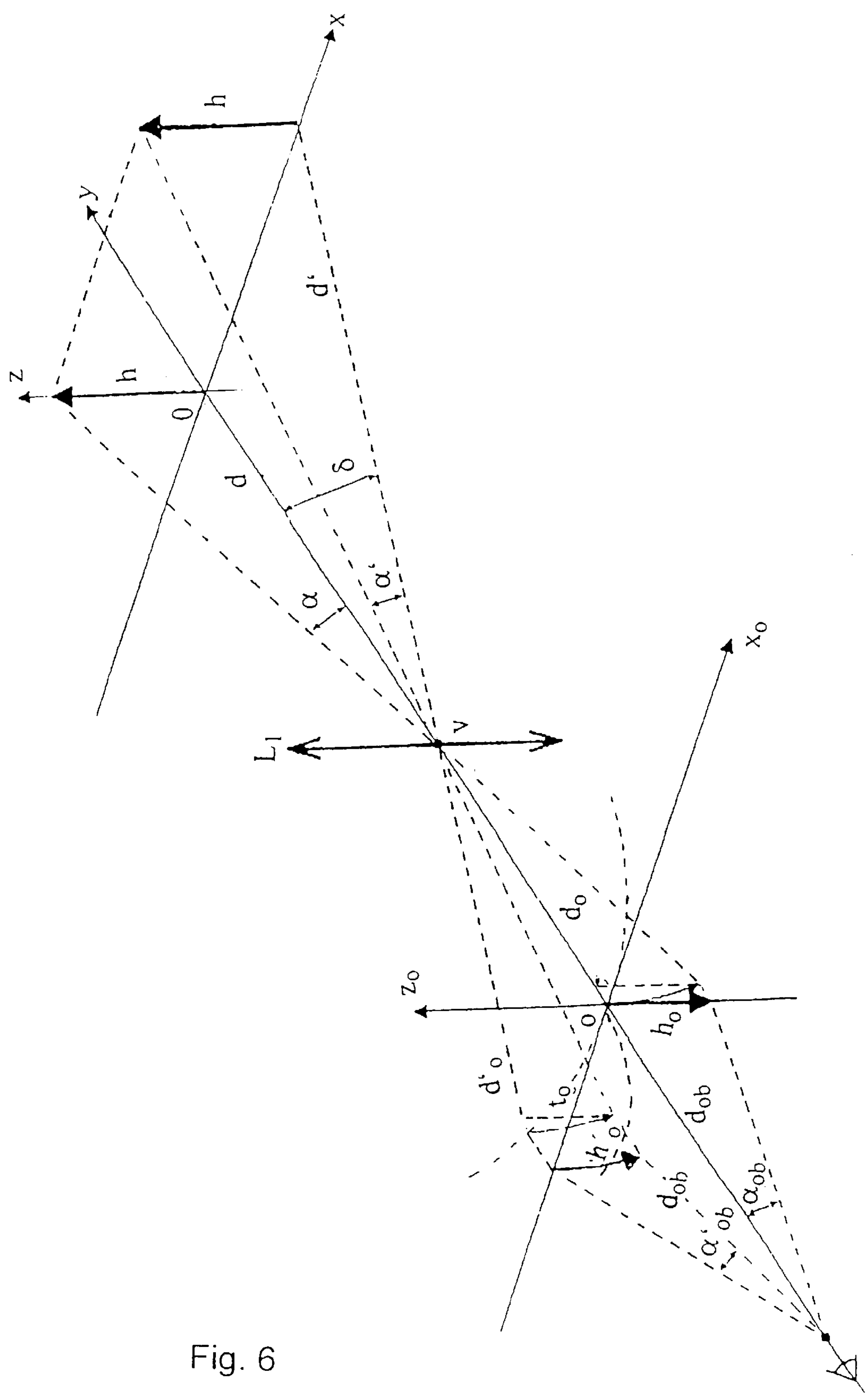
FIG. 6 shows the geometry of the orthographic projection.
Figure 7:
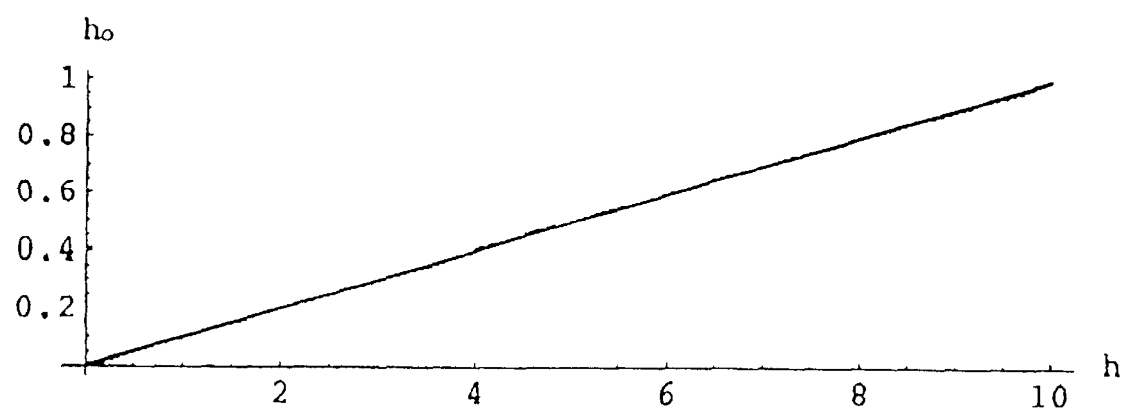
FIG. 7 shows the object image height ho as a function of the object h for a linear projection.

FIG. 7 illustrates the relationship shown above, the system parameters $d_o$ and d being set as constants. In an orthographic projection system (shown in FIG. 6), the similar relationship is shown by the formula $$h_o = \frac{d_o h}{\sqrt{d^2 + h^2}} \tag{2}$$

Figure 8:
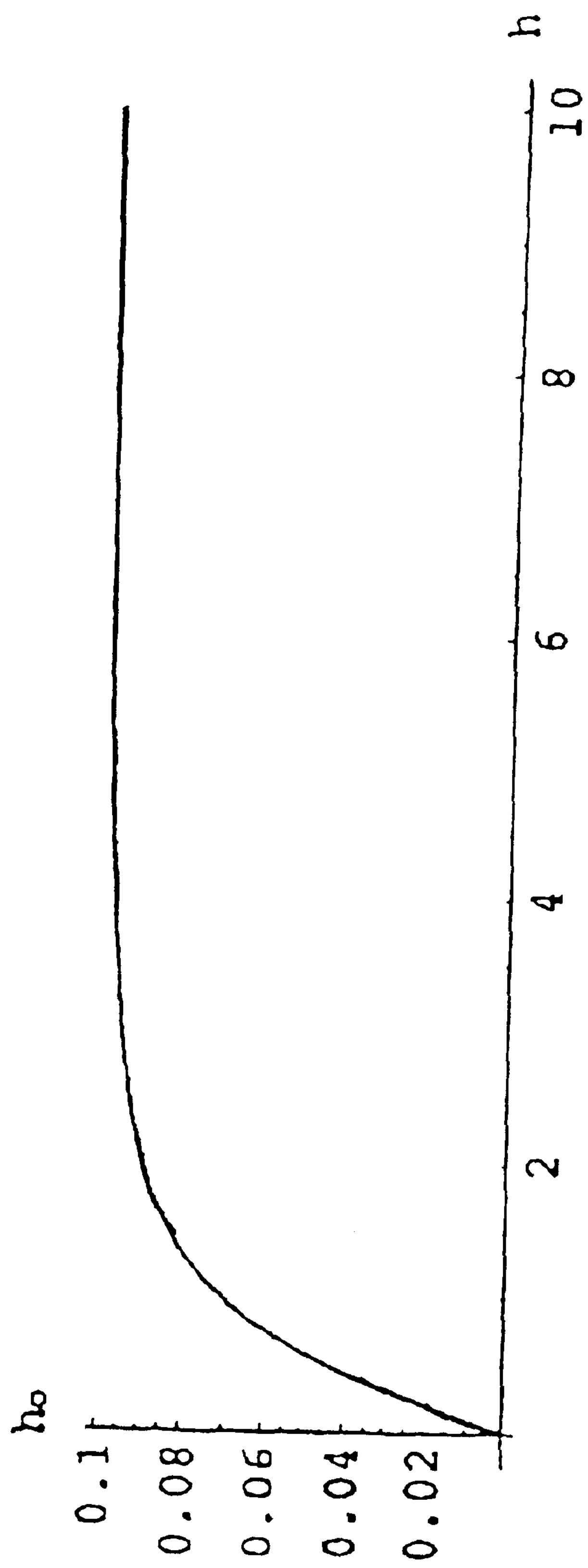
FIG. 8 shows the object image height ho as a function of the object h for an orthographic projection.

A diagram, in which the image height $h_o$ is plotted against the object height h is shown in FIG. 8. It can be seen immediately that, in the case of the linear projection, the image height is proportional to the object height, a coefficient depending on the parameters of the projection system. In the case of the orthographic projection, this is not so. In this case, at low object heights (up to a few ten percent of the projection system parameter $d_o$), the image height $h_o$ is still approximately proportional to the object height h. In general, it may be noted in this case that the greater the object height, the slower is the increase in the image height. Theoretically, the largest possible image height for this type of projection is equal to $d_o$ (the diagram in FIG. 8 was calculated with $d_o$=0.1).

The same phenomenon may be noted when the objects observed are moved out of the optical axis y of the orthographic projection system. In this situation, the image height $h'_0$ of objects with a constant height h is of interest to us. The objects are located at different positions on the plane x0z perpendicularly to the optical axis y of the system. If the height $h'_o$ is calculated as a function of the deviation angle δ (the angle, from which the object base surface is seen from standpoint v). For comparison purposes, the linear projection case is considered first. If the object is moved out of the optical axis of the system in such a manner, that the base surface of the object is viewed from standpoint v at an angle δ, the distance d' between the real object and the projection system increases according to the formula $$d' = \frac{d}{\cos\delta} \tag{3}$$

In the same manner, the distance $d'_o$ is determined by the formula $$d'_o = \frac{d_o}{\cos\delta} \tag{4}$$

Figure 9:
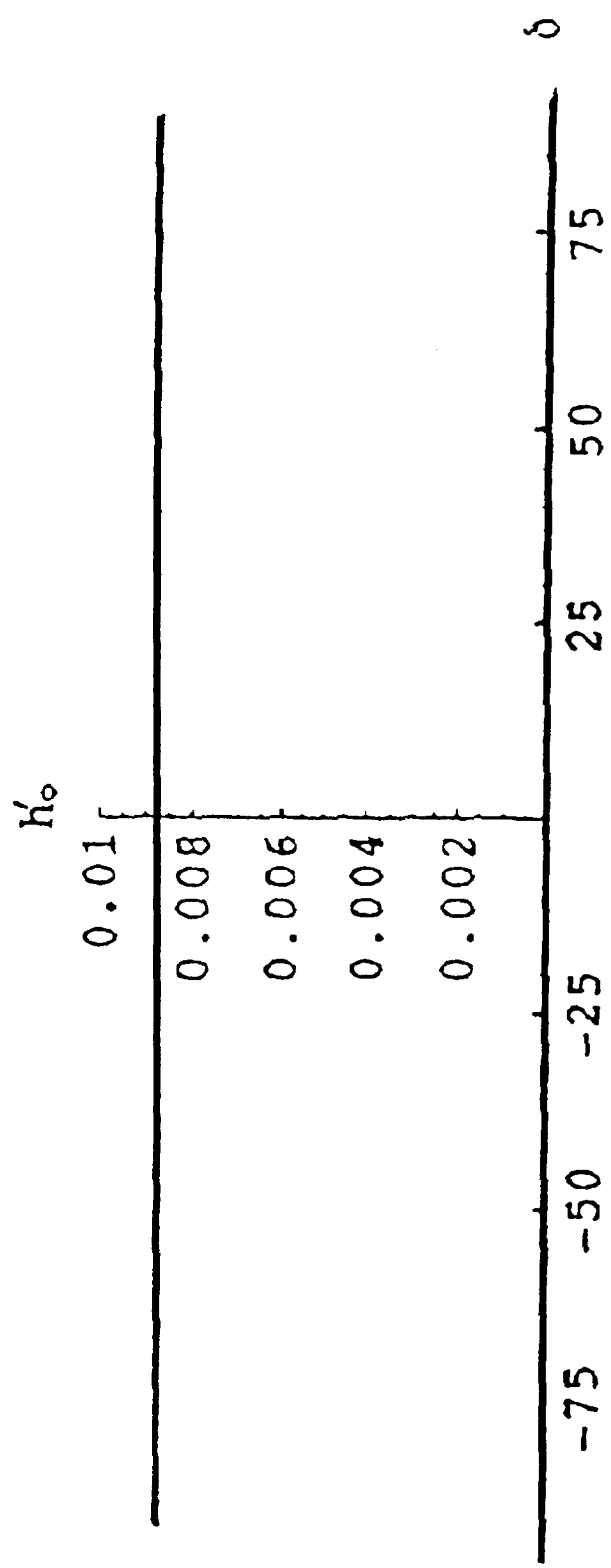
FIG. 9 shows the object image height h'o as a function of the deviation angle δ for a linear projection.

If equations (3) and (4) are inserted into equation (2), $$h'_o = \frac{d_o h}{d} \tag{5}$$

is obtained. It can be seen readily that the image height $h'_o$ does not depend on the angel of inclination δ. This is shown in FIG. 9. Contrary to this, in the case of the orthographic projection system, when an object is moved out of the optical axis of the system, only the object distance d' changes, whereas the image distance $d'_o$ remains constant and is equal to $d_o$. Since the object distance once again is given by the equation (3), the image height $h'_o$ can be calculated from the formula $$h'_o = \frac{d_o h}{\sqrt{\frac{d^2}{\cos^2} + h^2}} \tag{6}$$

Figure 10:
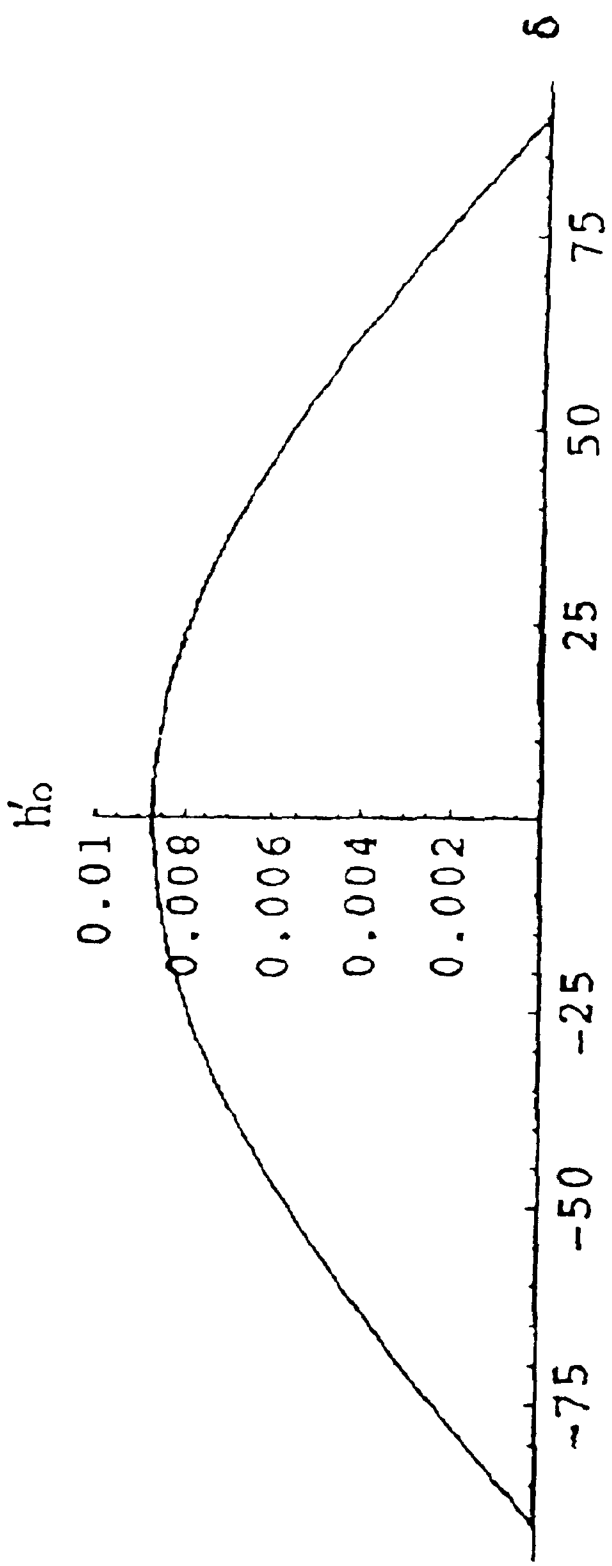
FIG. 10 shows the object image height h'o as a function of the deviation angle δ for an orthographic projection.

A representation of the height $h'_o$ as a function of the angle δ is shown in FIG. 10. It may be noted that, as the object moves away from the optical axis y of the system, the image height $h'_o$ becomes smaller. This is brought about by the increase in the distance between the object and the projection system. This phenomenon is quite natural. Let us imagine, for example, that we are standing in front of a very large painting, on which the symbol "a" is represented several times. It is clear that the symbols, which are directly in front of us on the painting, appear to be much larger than the symbols in the edge region of the painting.

Until now, we have investigated the image height as a function of the projection and of the parameters of the object observed. In the following, the image angle $\alpha'_o$, from which a viewer sees the image, is to be determined as a function of the above-mentioned parameters. It is assumed that the eye of the viewer is on the optical axis y of the projection system at a distance $d_{ob}$ from the image plane $x_o$0$y_o$. The object image is then seen from the angle $$\alpha'_{ob} = \arctan\frac{h'_o}{d'_{ob}} \tag{7}$$

Figure 11:
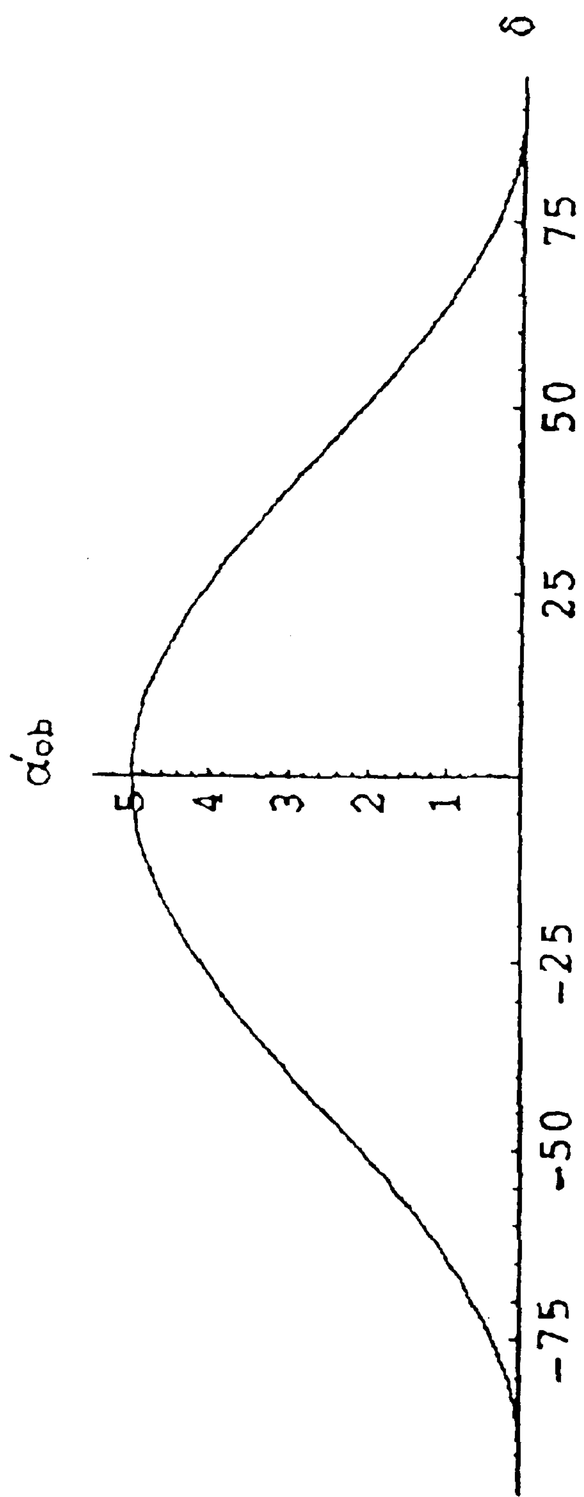
FIG. 11 shows the viewing angle α'ob as a function of the deviation angle δ for a linear projection.
Figure 12:
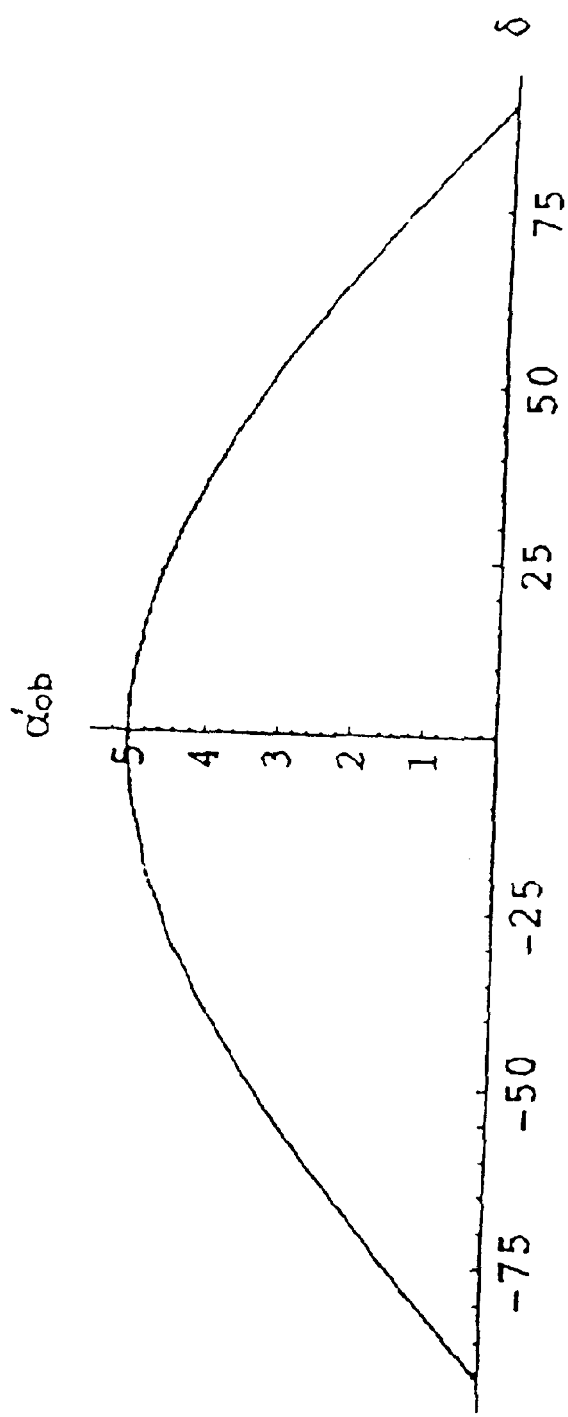
FIG. 12 shows the viewing angle α'ob as a function of the deviation angle δ for an orthographic projection.

$h'_o$ being defined by (5) for the linear projection and by (6) for the orthographic projection. The distance $d'_{ob}$ can be calculated from $$d'_{ob} = \sqrt{d_{ob}^2 + d_o^2}\tan^2\delta \quad (8)$$

for the linear projection and from $$d'_{ob} = \sqrt{d_{ob}^2 + \frac{d^2 d_o^2 \tan^2\delta}{d^2 + h^2\cos^2\delta}} \quad (9)$$

for the orthographic projection. If these equations are combined with equation (7), the following final formula is obtained for the viewing angle:

$$\alpha'_{ob} = \arctan\frac{d_o h}{\sqrt[d]{d_{ob}^2 + d_o^2\tan^2\delta}} \quad (10)$$

for the linear projection and $$\alpha'_{ob} = \arctan\frac{d_o h}{\sqrt{\frac{d_{ob}^2 d^2 + d_o^2 h^2\cos^2\delta + d^2 d_o^2\tan^2\delta}{\cos^2\delta}}} \quad (11)$$

for the orthographic projection. For both cases, the angle $\alpha'_{ob}$ is plotted as a function of the angle $\delta$ in FIGS. 11 and 12. For producing these diagrams, the projection system and the object parameters were selected so that objects, placed on the optical axis y of the system, are viewed at an angle of 5°. It can easily be noted that the course of the function is the same in the two cases—the image height varies inversely with the distance between the object and the optical axis y of the system. There are, however, important differences between the two cases, which we wish to point out. In the case of the linear type of projection, the image width extends infinitely, when the angle $\delta$ reaches 90°, whereas, in the case of the orthographic type of projection, the image which does not exceed the parameter value $d_o$. Moreover, it is clear that the real image size is distorted by the optics of the linear projection system.

Figure 13:
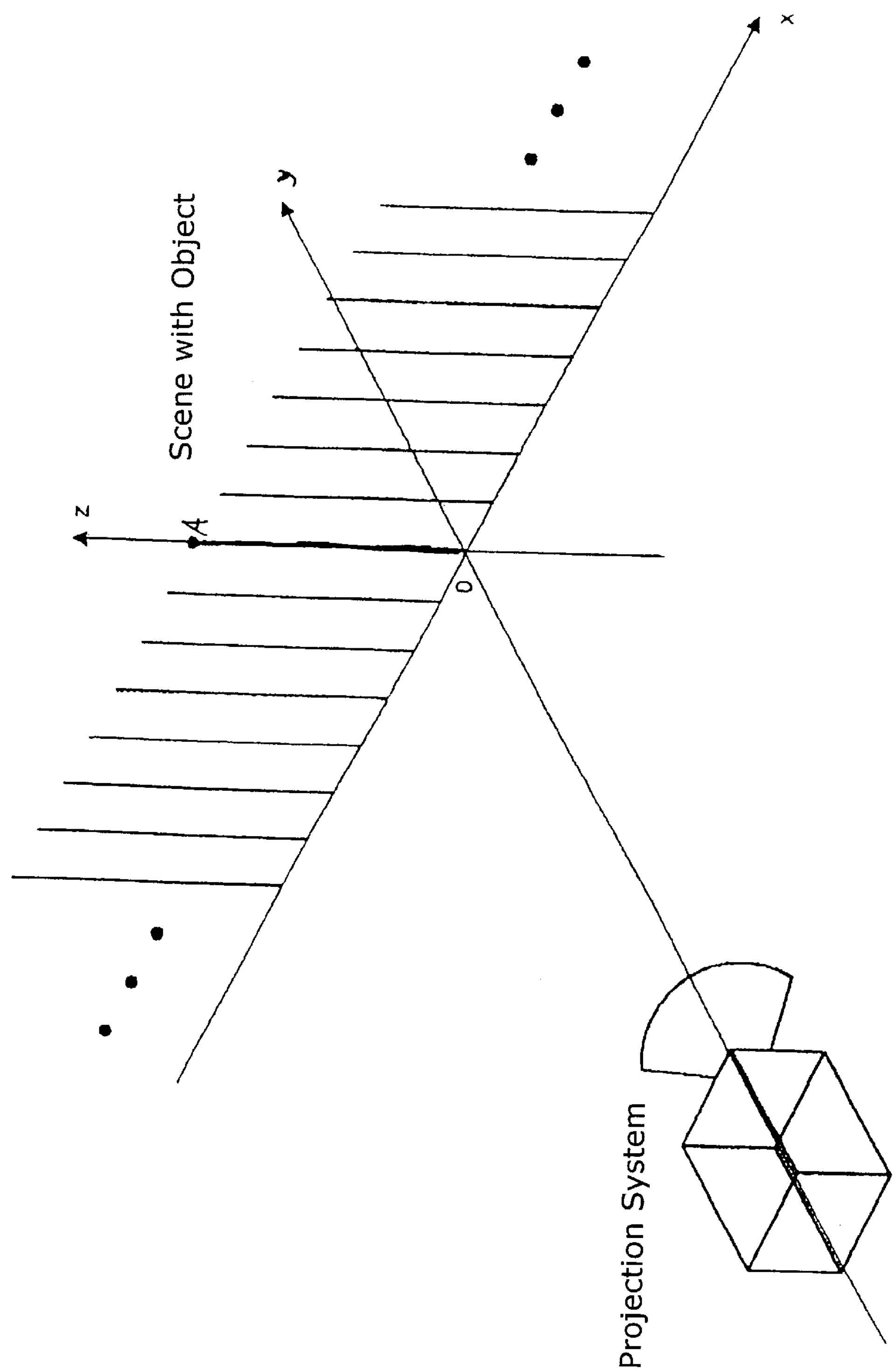
FIG. 13 shows a diagrammatic view of a scene—position of the projection system of example scene with objects of the projection system.
Figure 14:
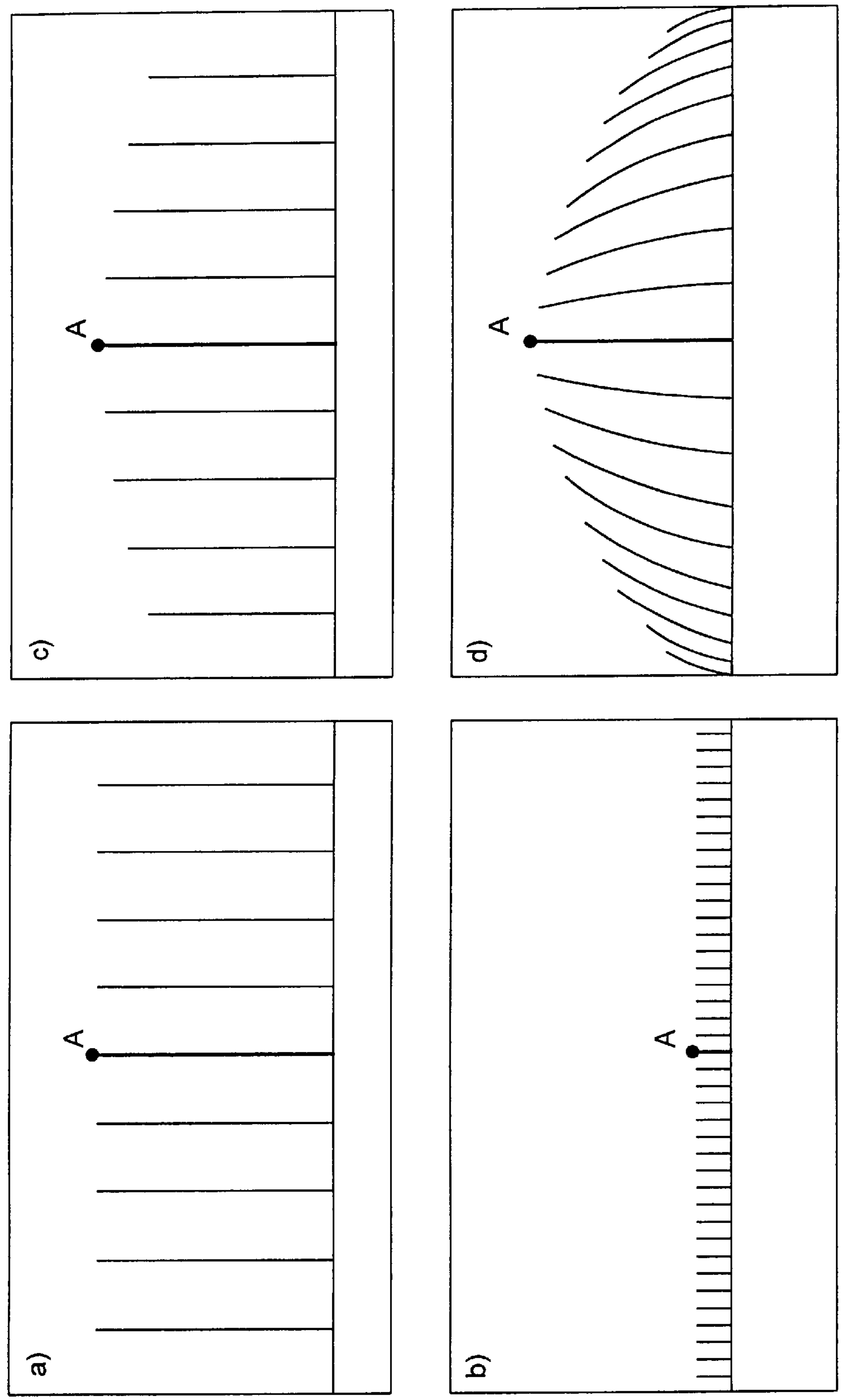
FIG. 14 shows images photographed in the situation shown in FIG. 13.

We will now attempt to estimate how the distinguishing features of the projection system affect the appearance of the resultant image. Let us imagine the following situation. In front of the projection system, in a plane perpendicular to the optical axis of the system, there is a series of rods of equal length (FIG. 13). FIG. 14 shows the representations of the scene shown in FIG. 13 with different projection system parameters. It can be seen that, in the case of the projection systems with small viewing angles, practically no difference can be noted between the images produced by means of linear or orthographic projection. Clear differences arise when large viewing angles of the projection systems are used. In this case, for a linear projection, we obtain an image, in which all reproductions of the rods appear to be small and of the same height, although the rods, which are directly in front of the projection system, are much closer than the rods at the side. The use of the orthographic projection system prevents such a situation. With an orthographic projection, we obtain an image, in which the rods, closer to the system, are reproduced larger than are the more remote rods.

Figure 15:
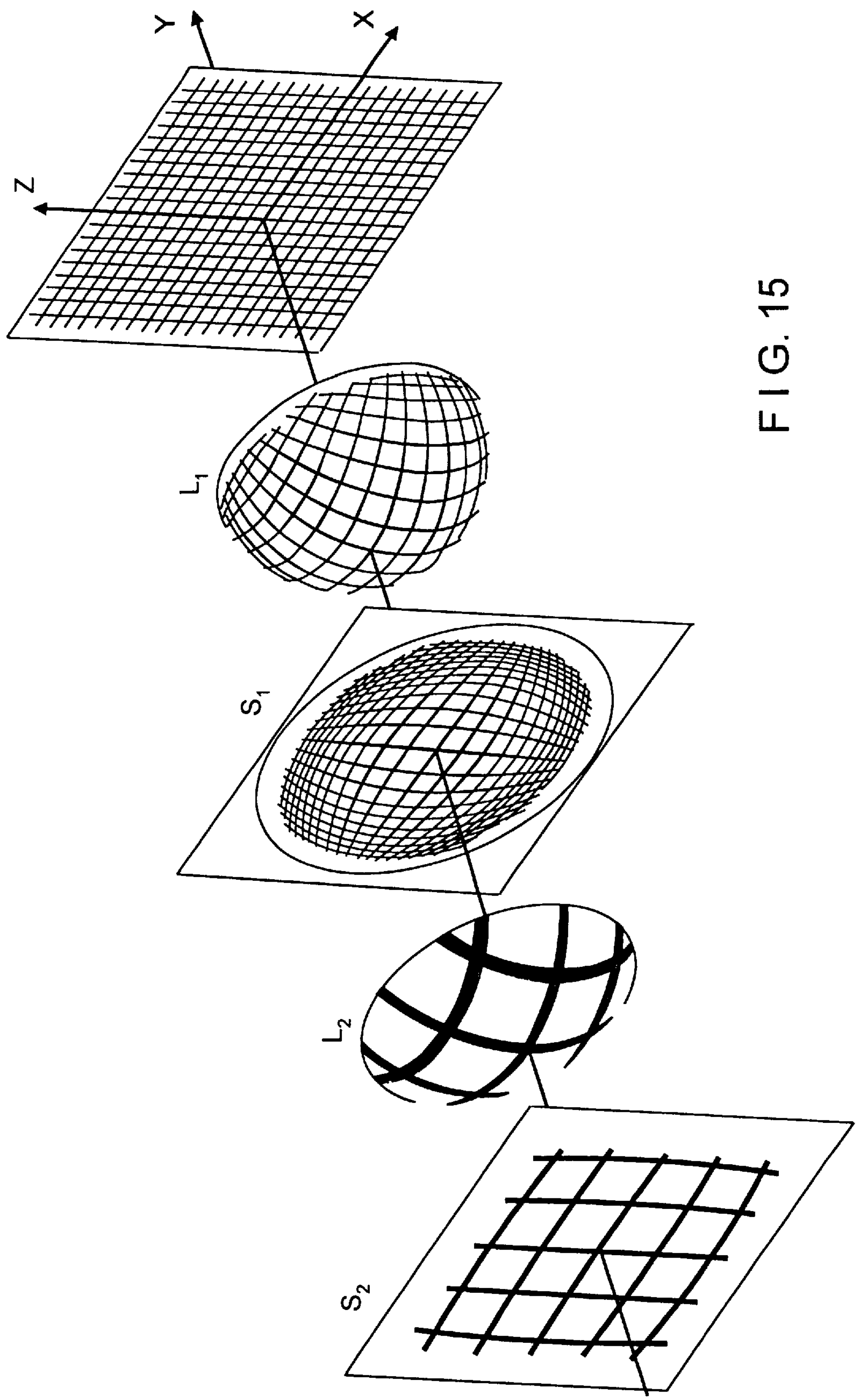
FIG. 15 shows a diagrammatic view of a set of orthographic zoom lenses.

The image generating process in the orthographic zoom lens set has two phases. In phase 1 (FIG. 15), an interim image is produced on a virtual screen $S_1$. This takes place by means of a lens (a lens set) $L_1$ of the "fisheye" type with a viewing angle of 180° according to the orthographic projection rule. Such an interim image is circular, the reproductions of the world objects, which are placed close to the optical axis of the lens set, being in the central part. In phase 2, a resultant image is generated on the screen $S_2$ on the basis of the interim image. For this purpose, an observation lens (lens set) $L_2$, acting according to the linear projection rule and having a given viewing angle (significantly smaller than 180°) is used. The main distinguishing feature of the proposed lens set consists therein that, when the viewing angle of the lens set is changed, the resultant image of the constant interim image is obtained, in that a portion thereof or the whole image is selected and enlarged. If the resultant image is distorted geometrically by the lens set, these distortions remain constant during the zooming process. This distinguishing feature of the lens set is particularly important and affects the reliability of the final image supplied by the video mixer.

The viewing direction of the orthographic zoom lens set is defined by the optical axis of the latter, and the standpoint position is defined by the position of the orthographic lens. The viewing angle of the set can be changed by changing the distance between the observation line $L_2$ and the virtual screen $S_1$. It should be noted that the viewing angle of the proposed lens set theoretically can be changed from 180° to 0°.

For describing the direction of rays, which are incident on the orthographic lens set, a pair of angles can be used: a right-angled incident angle $\alpha$ and an angle of reflection $\beta$ (FIG. 16). Without loss of the general validity, this representation enables the analysis to be continued with a two-dimensional model (in the OvY plane), which is obtained by defining the angle $\beta$.

A mathematical description of the process of generating the resultant image follows.

Under the above assumption, we can set $\beta$ equal to 0. If now a given point is seen by the orthographic zoom lens set with a viewing angle $\alpha$ (FIG. 17), an image on the virtual screen $S_1$ has a height of $$O'' = \frac{d_\delta}{d}O' = \frac{d_\delta}{d}r\sin\alpha \quad (12)$$

in which r represents a radius, which characterizes the orthographic projection used. This point corresponds to a point on the resultant screen $S_2$ at a height $$O = P = r\sin\alpha \quad (13)$$

Figure 18:
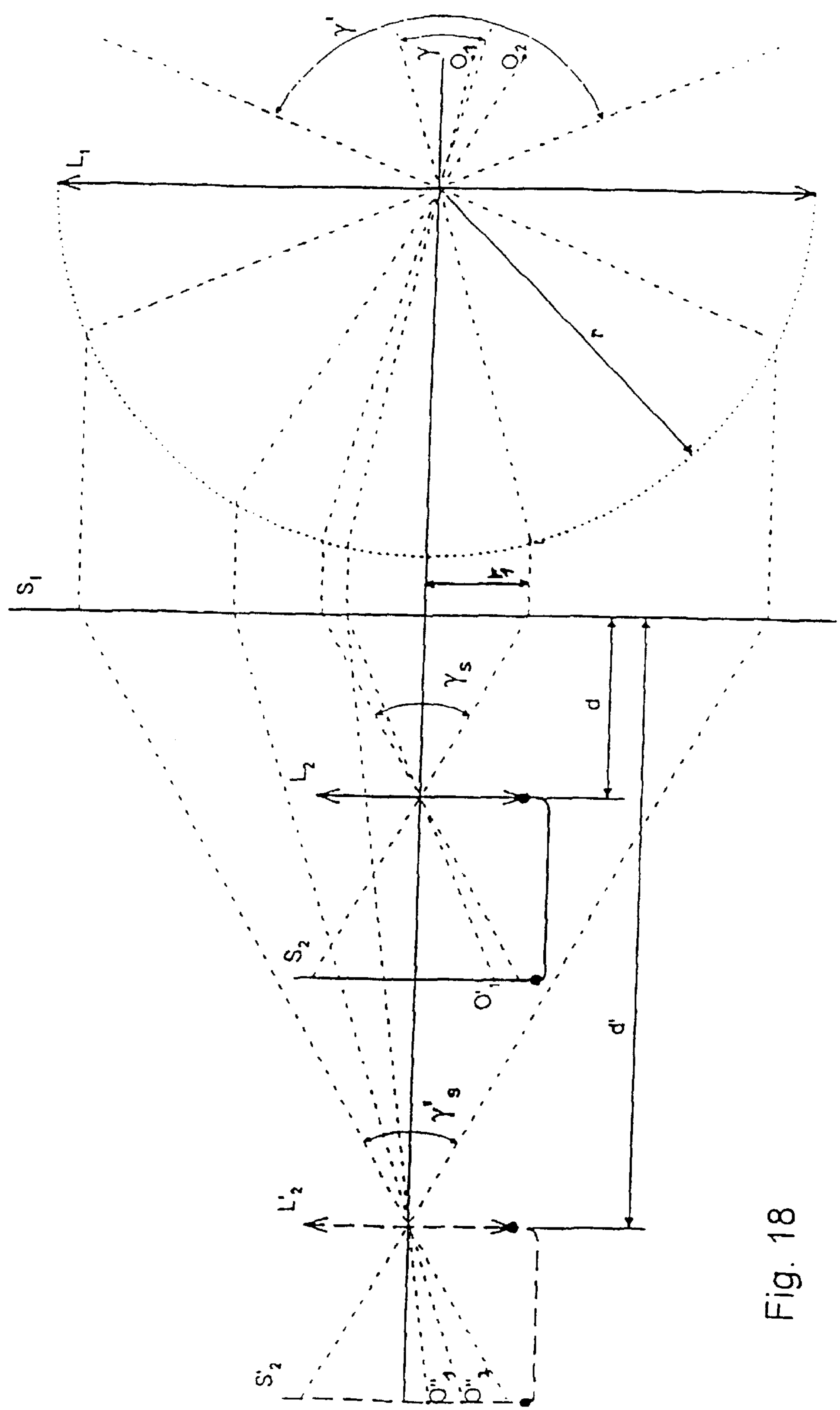
FIG. 18 shows a method for changing the viewing angle of the set of orthographic zoom lenses.

The viewing angle of the orthographic zoom lens set is calculated as follows:

Let the lens L2 be characterized by the maximum viewing angle $\gamma_o$ (FIG. 18). If it is placed at a distance d from the virtual screen $S_1$, a circular section of this screen, having a radius of $$r_1 = d\tan\frac{1}{2}\gamma_3 \quad (14)$$

is within the viewing a range of this lens. Within this range, there are reproductions of objects, which are seen through the lens $L_1$ at an angle not greater than $$\gamma = 2\arcsin\frac{\tan\frac{1}{2}\gamma_3}{r}d \tag{15}$$

Figure 19:
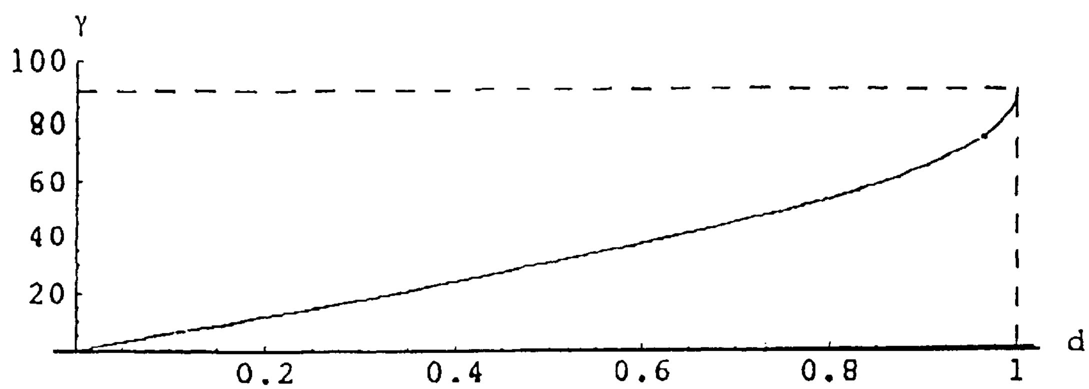
FIG. 19 shows the maximum viewing angle γ of the set of orthographic zoom lenses as a function of the distance d between lens L2 and the screen S1 and FIG. 20 shows a method for positioning and aligning the camera pan angle tilt angle roll angle.

At the same time, this is a viewing angle of the total zoom lens set. It should be noted that the values of $\gamma_o$ i r are constants, which characterize the lens set, and that the distance d is the only variable, which affects the viewing angle of the lens set. The viewing angle $\gamma$ of the zoom lens set is shown as a function of the distance d in FIG. 19.

Figure 20:
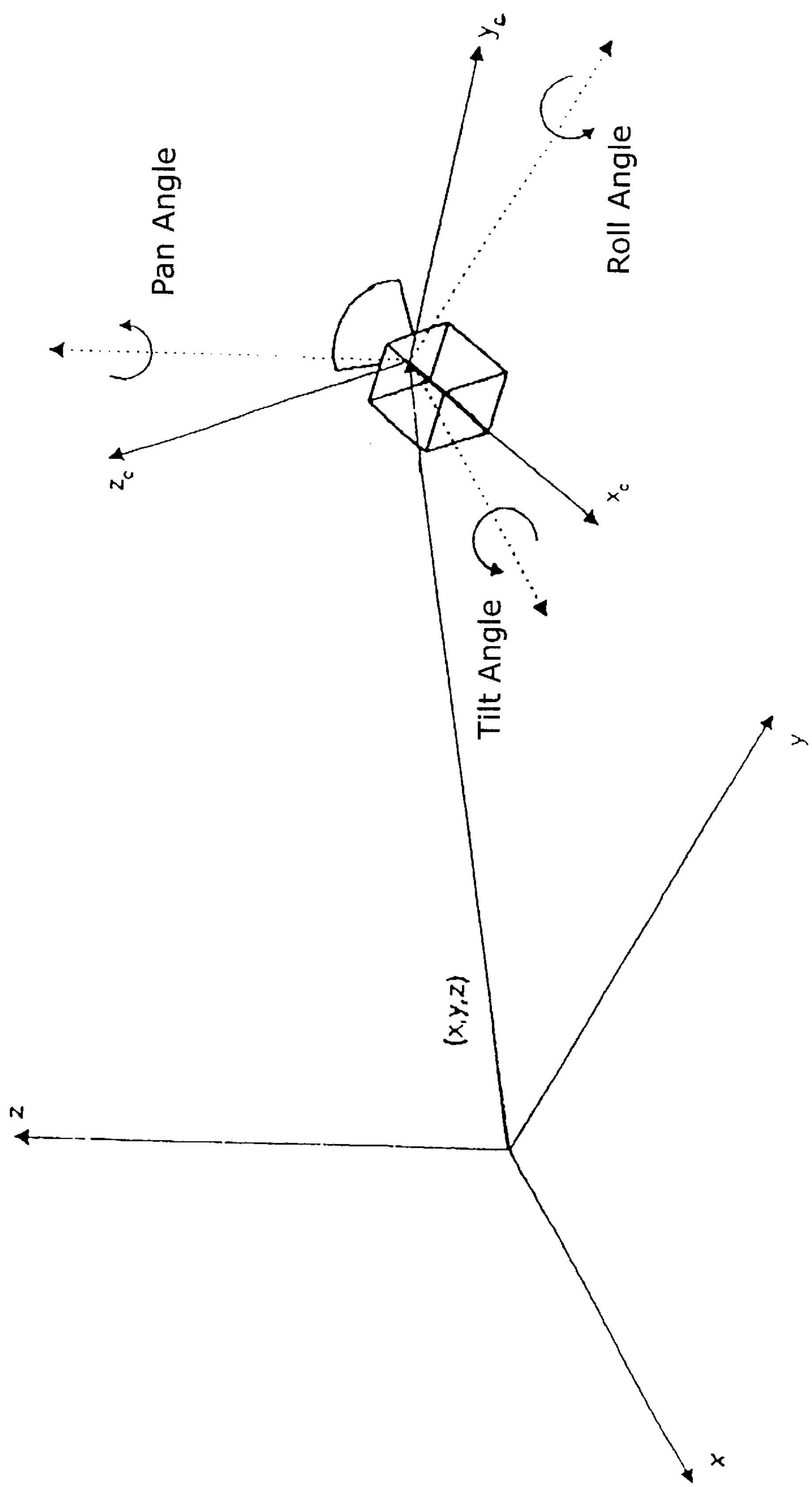

If the angle $\gamma_o$ for the lens $L_2$ is defined as a horizontal, vertical or diagonal viewing angle, the above-calculated viewing angle of the lens set is also defined as being horizontal, vertical or diagonal. The function of the camera movement control system is described in the following. The region, recorded by a camera at a given time, is defined by the actual camera viewing angle, the actual camera standpoint and the actual camera alignment. The camera movement control system is used in order to change the above-mentioned position and alignment of the camera. The system makes it possible to control all three position components of the camera standpoint, which is determined in the cartesian system by a vector (x, y, z), as well as to control the viewing direction of the camera by changing the three angles of rotation defined by TRP (tilt, roll, pan) (FIG. 20). With the help of the camera movement control system, it possible to change the position and alignment of the optical lens camera as well as of the CG lens camera. The difference between optical (real) and CG (virtual) cameras lies therein that, in the case of the real camera, the configuration of a mechanical device (manipulator), to which the camera is fastened, is changed, while in the case of the virtual camera, the respective matrixes for the alignment and position of the camera are subject to changes.

In its embodiment, the invention is not limited to the preferred examples given above. Rather, a number of variations is conceivable, which make use of all of the solutions presented even for basically different types of constructions.

What is claimed is:

1. An optical system for imaging an object with continuously variable magnification comprising:

an imaging plane disposed perpendicular to an optical axis of the system for imaging a region of said object thereon;

imaging optics disposed on the object side of said imaging plane; wherein said imaging optics and said imaging plane are constructed and arranged to move along the optical axis for focusing and for adjusting the magnification of an image appearing on the imaging plane;

a first optical element disposed on the object side of said imaging optics, wherein said first optical element is constructed and arranged to take up wide-angled optical radiation emanating from an object and selectively transmit a portion of this radiation which passes through a specified focal or nodal point of said first optical element; and, a second optical element positioned along the axis between the first optical element and said imaging optics so that said radiation passing through said specified focal or nodal point forms a first image of said object on an interim image plane disposed between the second optical element and the imaging optics;

whereby said first image can be projected by the imaging optics onto said imaging plane with continuously variable magnification.

2. The optical imaging system of claim 1, wherein the reproduction takes place orthographically on said interim image plane.

3. The optical imaging system of claim 2, wherein the reproduction takes place orthographically on the imaging plane.

4. The optical imaging system of claim 3, wherein the second optical element further comprises a planoconcave lens.

5. The optical imaging system of claim 4, wherein said planoconcave lens in said second optical element further comprises an interim image plane on its planar side; wherein said interim image plane further comprises a diffusor.

6. The optical imaging system of claim 5, wherein the concave surface of said planoconcave lens faces the image side of the first optical element, and is positioned along the optical axis so that its focal point coincides with the location of a nodal point or focal point of said first optical element.

7. The optical imaging system of claim 6, wherein the first optical element is a spherical lens.

8. The optical imaging system of claim 7, wherein the radius of curvature of the spherical lens is substantially equal to the focal length of the planoconcave lens.

9. The optical imaging system of claim 8, wherein the spherical lens resides conformingly adjacent to the concave surface of the planoconcave lens.

10. The optical imaging system of claim 6, wherein the first optical element comprises a pinhole diaphragm.

11. The optical imaging system of claim 10, wherein a film or a CCD sensor element is provided in the imaging plane.

12. The optical imaging system of claim 11, wherein an automatic focusing device is provided for focusing the image in the imaging plane.

* * * * *